Oct. 15, 1929.    G. GROVER    1,731,305
MACHINE FOR DELIVERING FUR TO HAT FORMERS
Filed Aug. 7, 1928    4 Sheets-Sheet 4
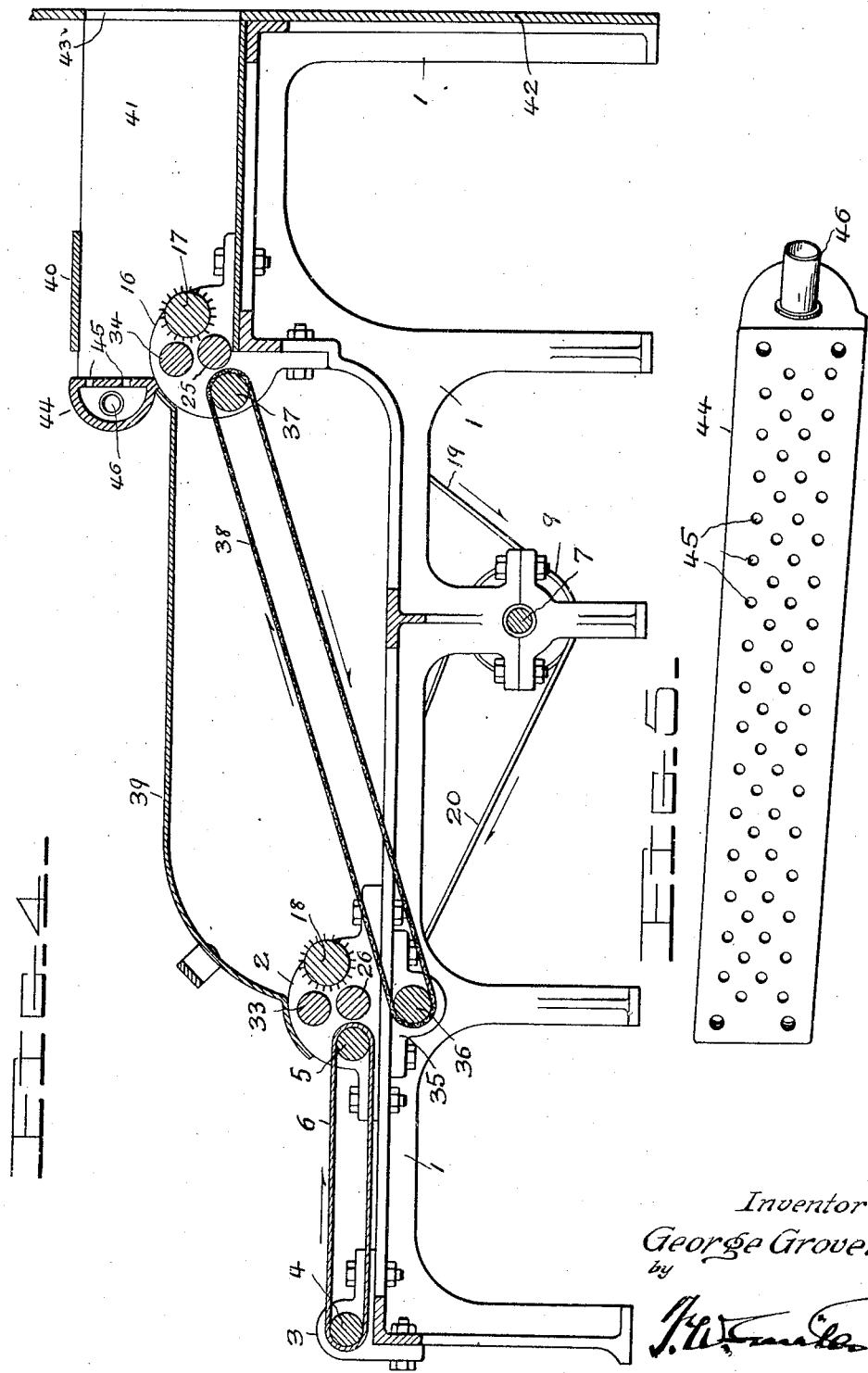
Inventor
George Grover
by
Attorney Patented Oct. 15, 1929

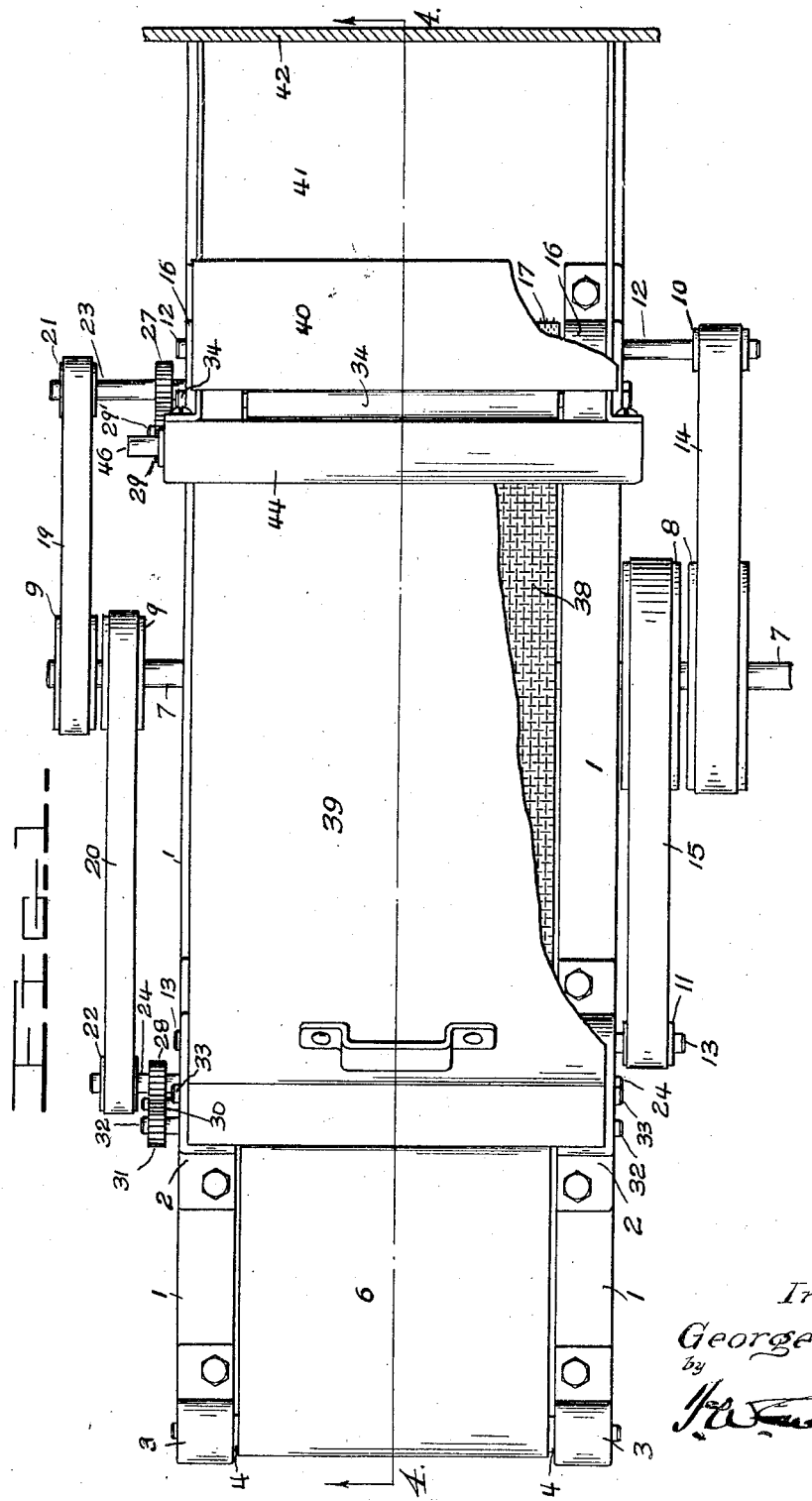

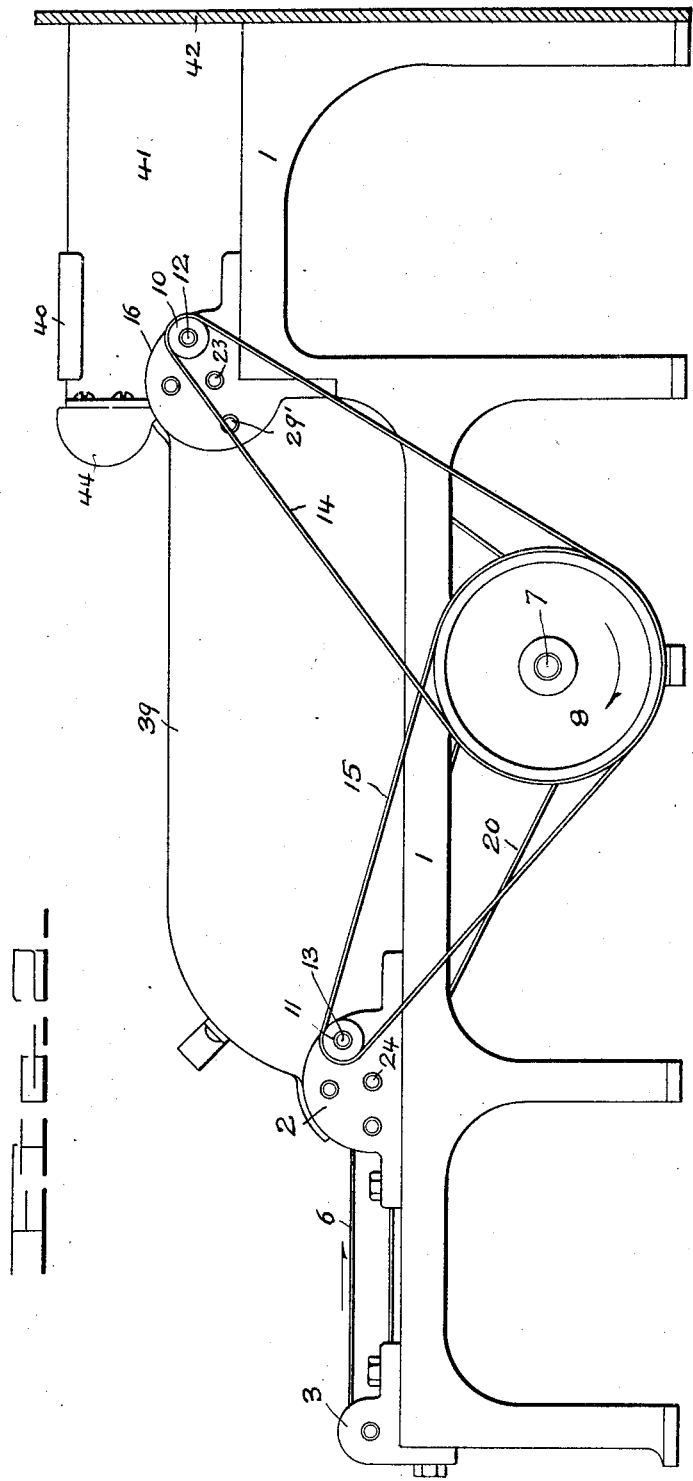

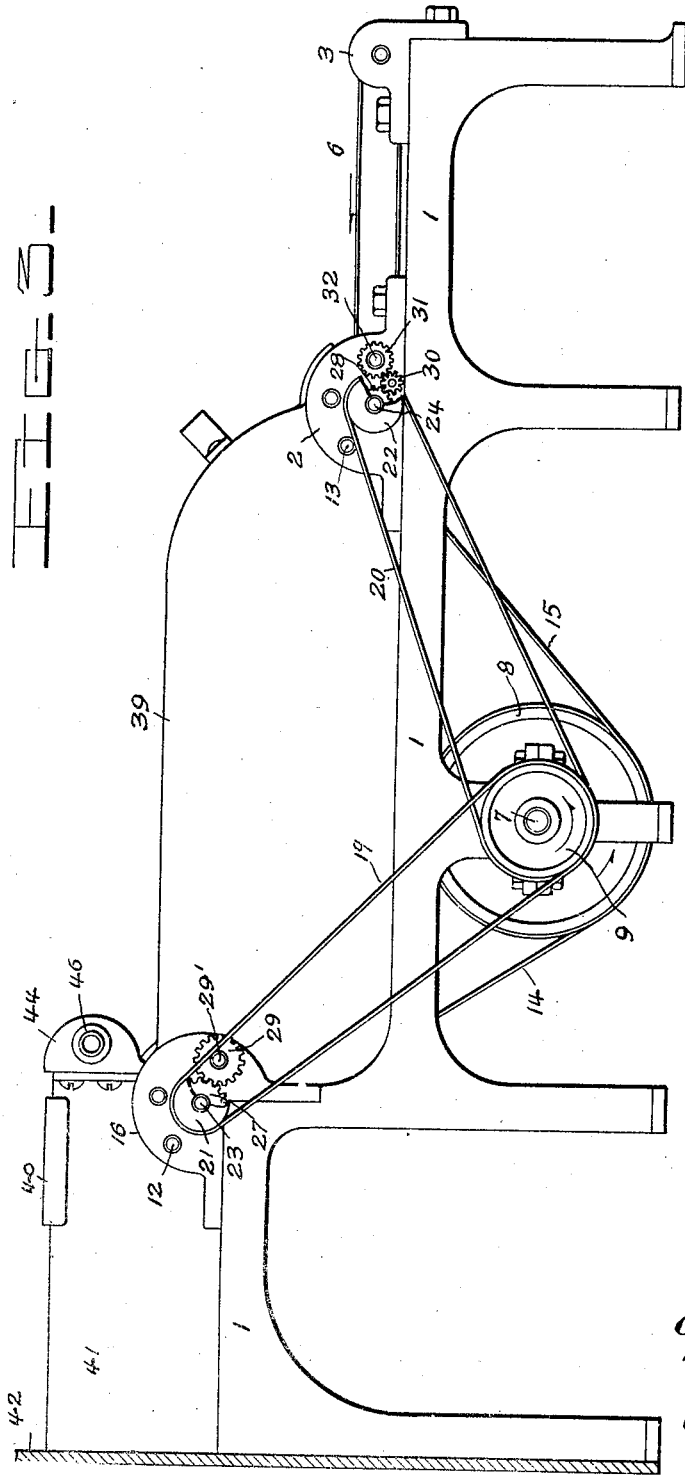

1,731,305

UNITED STATES PATENT OFFICE

GEORGE GROVER, OF EAST NORWALK, CONNECTICUT

MACHINE FOR DELIVERING FUR TO HAT FORMERS

Application filed August 7, 1928. Serial No. 298,114.

This invention relates to machines for delivering fur to hat formers, and has for its main objects, first, to thoroughly cleanse the fur of dirt or fine particles of fur before the fur is delivered to the means for driving it into the forming dome, and second, to force the fur into said dome by an air blast.

Heretofore, rapidly revolving brushes, or drums driven at high speed and carrying lags have been employed for creating an air current which drove the fur into the forming dome, but this has necessitated the use of special pulleys with their journals and belts to connect the pulleys with the brushes or drums, but my invention eliminates all these parts, by placing an air blast nozzle in the rear of the picker roll which acts to disseminate the fur immediately prior to its delivery into the hat forming dome.

In the accompanying drawings which illustrate one form of my improvement

Figure 1 is a plan view of my improved machine with the removable cover broken away and with the wall of the forming chamber dome sectioned, Figures 2 and 3 are elevations of opposite sides of the machine, Figure 4 is a section at the line 4—4 of Figure 1, and Figure 5 is a detail perspective view of the blower chamber.

Similar numerals of reference denote like parts in the several figures of the drawing.

1 is the frame of the machine, 2, 3, are pairs of spaced pillow blocks secured upon said frame, 4 is an idle roll journaled within the pillow blocks 3, 5 is a roll journaled within the pillow blocks 2, and 6 is a flexible apron carried by these rolls. 7 is the power shaft journaled in the frame of the machine and carrying on one side of the frame large pulleys 8 and on the other side of the frame small pulleys 9.

The large pulleys 8 are connected with pulleys 10 and 11 on the ends of shafts 12 and 13 by means of belts 14 and 15, and these shafts are respectively journaled within a pillow block 16 secured to the frame and the pillow block 2 and carry picker rolls 17, 18.

The pulleys 9 are connected by belts 19, 20, with pulleys 21, 22, on the ends of shafts 23, 24, that are journaled respectively within the blocks 16 and 2, and these shafts 23 and 24 carry rolls 25 and 26.

Secured to the shafts 23 and 24 are spur gears 27, 28, which mesh respectively with a spur gear 29 on the shaft $29^1$ and an idle gear 30 that is journaled to the block 2, this idle gear meshing with a spur gear 31 that is on the end of the shaft 32 of the roll 17, so that it will be clear that, by means of this intermediate idle roll, the apron 6 carried by the rolls 4, 5, will be caused to travel in the direction of the arrows which arrows are shown in Figs. 2, 3 and 4, and appear directly above the belt 6. 33, 34, are idle rolls journaled within the blocks 2 and 16 and positioned in proximity to the picker roll 17 and the rolls 26 and 25, so that it will be clear that when fur is deposited upon the apron 6 it will be delivered between the rolls 33 and 26 directly to the picker roll 18.

Journaled within pillow blocks 35 (only one shown) secured to the underside of the frame on each side thereof is an idle roll 36, and journaled in the pillow blocks 16 is a roll 37 whose shaft $29^1$ carries the spur gear 29, and these rolls 36 and 37 are connected by a belt 38 made of open mesh material such as wire, the belt being inclined upwardly from a point below the picker 18 to a point near the level of the picker 17.

When the fur has been carried by the apron 6, between the rolls 26 and 33 to the picker roll 18, it will be thrown by the latter upwardly and forwardly and will drop upon the belt 38 and all dust or other foreign matter that is mixed with the fur will be sifted through the belt, so that the fur that is delivered by this belt between the rolls 25 and 34 to the picker 17 will be clean.

A removable cover 39 is placed over the belt 38, so that none of the fur can be lost when it is thrown by the picker 18, and all particles of fur that are thrown against this cover will, of course, drop down upon this belt.

As the fur is finally delivered to the picker 17 it will be thrown upwardly, and therefore a guard plate 40 is provided which bridges the sides of a box chute 41, so that the fur will strike this guard and be deflected downwardly.

42 represents the side wall of the dome of a hat forming machine, within which dome the usual forming cone is located, and 43 is an opening in this wall.

The box chute 41 is open at the end and is positioned against the wall 42 opposite the opening 43, so that fur may be delivered from this box chute directly into the hat forming chamber, and the guard 40 spans only a portion of the length of this chute for the purpose presently to be explained.

Secured in any suitable manner to the upper portion of the box chute 41 so as to be above and in the rear of the picker roll 17, is a hollow blower chamber 44 which is provided with numerous perforations 45 in its face which latter is toward the picker roll, and 46 represents an air blast pipe which extends within one end of this blower, so that when the fur is thrown by the picker 17 against the guard plate 40, the air blast through the perforations 45 will blow this fur directly into the forming chamber.

The wider the roof guard 40, the greater will be the top area of the box chute 41 covered by this roof, and therefore the greater will be the area contacted by the fur thrown from the picker, and accordingly more fur will get into the hat being formed, particularly at the tip, and therefore this matter is easily regulated by the width of the guard plate.

The rolls 26, 33, constitute the means whereby the fur is fed to the initial picker roll 18, while the rolls 25 and 33 are the means whereby the fur is delivered to the final picker roll 17.

As before stated, this machine is positioned with the box-like chute 41 leading into the dome of the hat forming chamber proper, and the operator deposits on the apron 6 a certain amount of fur which has been previously weighed and this apron conveys the fur to the feeding rolls 26, 33, which deliver it to the picker 18, the latter operating to disseminate the fur so that it will fall sparsely upon the perforate conveyor belt 38 and thereby be conveyed to the second set of feed rolls 25, 34, which operate to deliver the fur to the final picker roll 17, the latter likewise serving to disseminate the fur so that it will be blown in this condition by the air blast within the chamber 44 directly into the hat forming chamber through the opening 43 in the wall of the latter.

It is preferred to make the sieve belt 38 of wire with a mesh suitable to admit dirt or other foreign matter but not large enough to allow the fur particles to drop through, since there will be more or less vibration of this belt, when made of wire, due to the resiliency of the latter, as is well known, which will cause it to more perfectly act as a sieve.

What is claimed is:—

1. A machine for delivering fur into a hat forming chamber including, an initial picker roll, a final picker roll located in a plane considerably above the initial roll, an inclined travelling belt interposed between said rolls and forming the sole means to convey the fur from the initial to the final roll, a box chute for receiving fur from the final picker roll and for delivering same into the forming chamber, air blast means at the rear of the box chute and above the final picker roll for blowing the fur disseminated by the final picker across the box chute and into the forming chamber, and a cover extending over the initial roll and the belt and spaced at a distance thereabove to provide space gradually decreasing in depth between the cover and belt toward the high end of the belt, thereby to enable the fur to freely float in such space, the belt being foraminated so as to sift the heavier foreign particles and hairs therethrough which gravitate onto the belt.

2. A machine for delivering fur into a hat forming chamber in accordance with claim 1, in which the top of the box chute is provided with a guard plate located above the air blast means and of predetermined width.

In testimony whereof I affix my signature hereto.

GEORGE GROVER.